United States Patent
Morales

(10) Patent No.: US 11,218,618 B1
(45) Date of Patent: *Jan. 4, 2022

(54) INTELLIGENT MEDIA PROFILE MANAGEMENT

(71) Applicant: KYOCERA DOCUMENT SOLUTIONS INC., Osaka (JP)

(72) Inventor: Javier A. Morales, Rochester, NY (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/030,665

(22) Filed: Sep. 24, 2020

(51) Int. Cl.
*H04N 1/60* (2006.01)

(52) U.S. Cl.
CPC ......... *H04N 1/6097* (2013.01); *H04N 1/6008* (2013.01); *H04N 1/6033* (2013.01)

(58) Field of Classification Search
CPC ... H04N 1/6097; H04N 1/6008; H04N 1/6033
See application file for complete search history.

(56) References Cited

U.S. PATENT DOCUMENTS

| | | | | |
|---|---|---|---|---|
| 8,358,440 B2* | 1/2013 | Ernst | .................... | H04N 1/6097 358/1.9 |
| 8,412,055 B2* | 4/2013 | Chandu | ................ | H04N 1/6097 399/15 |
| 2003/0117639 A1* | 6/2003 | Milton | .................. | H04N 1/6097 358/1.13 |
| 2003/0151757 A1* | 8/2003 | Bestmann | ............ | H04N 1/6022 358/1.9 |
| 2005/0094209 A1* | 5/2005 | Hasler | .................... | H04N 1/603 358/2.1 |
| 2005/0141008 A1* | 6/2005 | Billow | .................. | G06F 3/1284 358/1.13 |
| 2012/0019881 A1* | 1/2012 | Lammens | ................ | H04N 1/46 358/530 |
| 2012/0206745 A1* | 8/2012 | Shibuya | ............... | H04N 1/6033 358/1.9 |
| 2015/0201111 A1* | 7/2015 | Takasaki | ............... | G06F 3/1285 358/1.9 |
| 2017/0171432 A1* | 6/2017 | Qiao | .................. | G06K 15/1836 |
| 2018/0189617 A1* | 7/2018 | Feng | .................. | G06K 15/4025 |

FOREIGN PATENT DOCUMENTS

| | | | | |
|---|---|---|---|---|
| EP | 2487893 A1 * | 8/2012 | .......... | H04N 1/6097 |
| EP | 2487893 B1 * | 5/2016 | .......... | H04N 1/6097 |

* cited by examiner

*Primary Examiner* — Ted W Barnes
(74) *Attorney, Agent, or Firm* — GrowIP Law Group LLC

(57) ABSTRACT

Systems and methods manage information relating to paper media to enhance the quality of printing by printers. Systems and methods efficiently maintain color management profiles for different papers and ensure that the most appropriate (e.g., optimal) color management profile is employed for color conversion on a specific paper. In particular, embodiments may employ dynamic management of data stored in paper catalogs of printing systems. As such, a paper catalog of a printer device can effectively associate a paper with a color management profile that provides the best possible color reproduction on that paper.

13 Claims, 9 Drawing Sheets

INTELLIGENT MEDIA PROFILE MANAGEMENT

FIELD OF THE INVENTION

The present disclosure relates generally to printing on paper media, and more particularly, to managing information relating to different paper media to enhance the quality of printing by printers.

BACKGROUND

To achieve high quality color reproduction, print shops employ different color management profiles for paper media. Ideally, each paper has a one-to-one association with a color management profile customized for each printer. In reality, however, print shops cannot profile all the papers they use. Most print shops use hundreds of papers, but to create a good color management profile for each paper, 1,000 to 2,000 color patches must be printed and measured.

A printer manufacturer may validate (at most) a few hundred papers with a printer device. The printer device may store a paper catalog including color management profiles for these few hundred validated papers. However, there are thousands of other papers on the market that are not included in the paper catalog.

Most print shops can add papers to the paper catalog stored by a printer, but the printer device manufacturer does not provide color management profiles for these added papers. Print shops can use color management profiles provided by paper producers, but these color management profiles are developed for an "average" printer device and may not produce high quality color reproduction for particular printers.

Given the challenges of profiling a large number of different papers, many print shops do minimal, if any, color management.

SUMMARY

According to aspects of the present disclosure, systems and methods manage information relating to paper media to enhance the quality of printing by printers. According to aspects of the present disclosure, systems and methods efficiently maintain color management profiles for different papers and ensure that the most appropriate (e.g., optimal) color management profile is employed for color conversion on a specific paper. In particular, embodiments may employ dynamic management of data stored in paper catalogs of printing systems. As such, a paper catalog of a printer device can effectively associate a paper with a color management profile that provides the best possible color reproduction on that paper.

In an example embodiment, a method for managing paper information in a printing system includes storing, in one or more computer storage devices, a paper catalog. The paper catalog includes records associated with measured papers. The records include respective color information and a respective color management profile for each of the measured papers. The method includes identifying, by one or more computer processors, a standard paper. The method includes determining, by the one or more computer processors, color information for the standard paper. The method includes comparing, by the one or more computer processors, the color information for the standard paper and the color information for the measured papers. Responsive to comparing the color information for the standard paper and the color information for the measured papers, the method includes correlating, by the one or more computer processors, one of the measured papers to the standard paper. The method includes storing, in the one or more computer storage devices, a record for the standard paper in the paper catalog. The record for the standard paper includes the color information for the standard paper and a reference to the correlated measured paper. The standard paper is associated with the color management profile of the correlated measured paper.

In another example embodiment, a system for managing paper information in a printing system includes one or more computer storage devices configured to store a paper catalog. The paper catalog includes records associated with measured papers. The records include respective color information and a respective color management profile for each of the measured papers. The system includes one or more computer processors configured to execute instructions stored on computer-readable media, the instructions causing the one or more processors to identify a standard paper. The one or more processors determine color information for the standard paper. The one or more processors compare the color information for the standard paper and the color information for the measured papers. Responsive to comparing the color information for the standard paper and the color information for the measured papers, the one or more processors correlate one of the measured papers to the standard paper. The one or more processors store, in the one or more computer storage devices, a record for the standard paper in the paper catalog, the record for the standard paper including the color information for the standard paper and a reference to the correlated measured paper, wherein the standard paper is associated with the color management profile of the correlated measured paper.

In a further example embodiment, one or more non-transitory computer-readable storage media have instructions stored thereon, where when executed by a one or more processors, the computer-executable instructions cause the one or more processors to store, in one or more computer storage devices, a paper catalog. The paper catalog includes records associated with measured papers. The records include respective color information and a respective color management profile for each of the measured papers. The one or more processors identify a standard paper. The one or more processors determine color information for the standard paper. The one or more processors compare the color information for the standard paper and the color information for the measured papers. Responsive to comparing the color information for the standard paper and the color information for the measured papers, the one or more processors correlate one of the measured papers to the standard paper. The one or more processors store, in the one or more computer storage devices, a record for the standard paper in the paper catalog. The record for the standard paper includes the color information for the standard paper and a reference to the correlated measured paper. The standard paper is associated with the color management profile of the correlated measured paper.

In an example embodiment, a method for managing paper information in a printing system includes storing, in one or more computer storage devices, a paper catalog. The paper catalog includes first records associated with measured papers. The first records include respective color information and a respective color management profile for each of the measured papers. The paper catalog includes second records associated with standard papers. The second records includes respective color information and a respective reference to one of the measured papers for each of the standard papers. The method includes identifying, by one or more processors, an additional measured paper, wherein the additional measured paper is not associated with any of the records in the paper catalog. The method includes determining, by the one or more processors, color information and a color management profile for the additional measured paper. The method includes storing, in the one or more computer storage devices, a new first record for the additional measured paper in the paper catalog. The new first record includes the color information and the color management profile for the additional measured paper. The method includes, responsive to storing the new first record for the additional measured paper in the paper catalog, updating, by the one or more processors, the references for the second records in the paper catalog.

In another example embodiment, a system for managing paper information in a printing system includes one or more computer storage devices configured to store a paper catalog. The paper catalog includes first records associated with measured papers. The first records includes respective color information and a respective color management profile for each of the measured papers. The paper catalog includes second records associated with standard papers. The second records include respective color information and a respective reference to one of the measured papers for each of the standard papers. The system includes one or more processors configured to execute instructions stored on non-transitory computer-readable media. The instructions cause the one or more processors to identify an additional measured paper, wherein the additional measured paper is not associated with any of the records in the paper catalog. The instructions cause the one or more processors to determine color information and a color management profile for the additional measured paper. The instructions cause the one or more processors to store, in the one or more computer storage devices, a new first record for the additional measured paper in the paper catalog. The new first record includes the color information and the color management profile for the additional measured paper. The instructions cause the one or more processors to, responsive to storing the new first record for the additional measured paper in the paper catalog, update the references for the second records in the paper catalog.

A further example embodiment includes one or more non-transitory computer-readable storage media for a printing system. The printing system includes one or more computer storage devices configured to store a paper catalog. The paper catalog includes first records associated with measured papers. The first records include respective color information and a respective color management profile for each of the measured papers. The paper catalog includes second records associated with standard papers. The second records include respective color information and a respective reference to one of the measured papers for each of the standard papers. The one or more non-transitory computer-readable storage media has computer-executable instructions stored thereon, wherein when executed by a one or more processors, the computer-executable instructions cause the one or more processors to identify an additional measured paper, wherein the additional measured paper is not associated with any of the records in the paper catalog, the computer-executable instructions cause the one or more processors to determine color information and a color management profile for the additional measured paper. The computer-executable instructions cause the one or more processors to store, in the one or more computer storage devices, a new first record for the additional measured paper in the paper catalog, the new first record including the color information and the color management profile for the additional measured paper. The computer-executable instructions cause the one or more processors to, responsive to storing the new first record for the additional measured paper in the paper catalog, update the references for the second records in the paper catalog.

In an example embodiment, a method for managing paper information in a printing system including storing, in one or more computer storage devices, a paper catalog. The paper catalog including records for measured papers and standard papers. Each record for the measured papers has a respective color information and a respective color management profile. Each record for the standard papers has a respective color information but no respective color management profile. The method includes dynamically responding to a modification to the paper catalog by comparing, by the one or more processors, the color information for the standard papers and the color information for the measured papers; responsive to comparing the color information for the standard papers and the color information for the measured papers, correlating, by the one or more processors, the measured papers to the standard papers; and further updating, by the one or more processors, the records of the paper catalog according to the correlations between the measured papers and the standard papers.

In another example embodiment, a system for managing paper information in a printing system includes one or more computer storage devices configured to store a paper catalog including records for measured papers and standard papers. Each record for the measured papers has a respective color information and a respective color management profile. Each record for the standard papers has a respective color information but no respective color management profile. The system includes one or more processors configured to execute instructions stored on computer-readable media. The instructions cause the one or more processors to dynamically respond to a modification to the paper catalog by comparing the color information for the standard papers and the color information for the measured papers; responsive to comparing the color information for the standard papers and the color information for the measured papers, correlating the measured papers to the standard papers; and further updating the records of the paper catalog according to the correlations between the measured papers and the standard papers.

A further example embodiment includes one or more non-transitory computer-readable storage media for a printing system. The printing system includes one or more computer storage devices configured to store a paper catalog including records for measured papers and standard papers. Each record for the measured papers has a respective color information and a respective color management profile. Each record for the standard papers has a respective color information but no respective color management profile. The one or more non-transitory computer-readable storage media has computer-executable instructions stored thereon, wherein when executed by a one or more processors, the computer-executable instructions cause the one or more processors to dynamically respond to a modification to the paper catalog by comparing the color information for the standard papers and the color information for the measured papers; responsive to comparing the color information for the standard papers and the color information for the measured papers, correlating the measured papers to the standard papers; and further updating the records of the paper catalog according to the correlations between the measured papers and the standard papers.

Figure 1A:
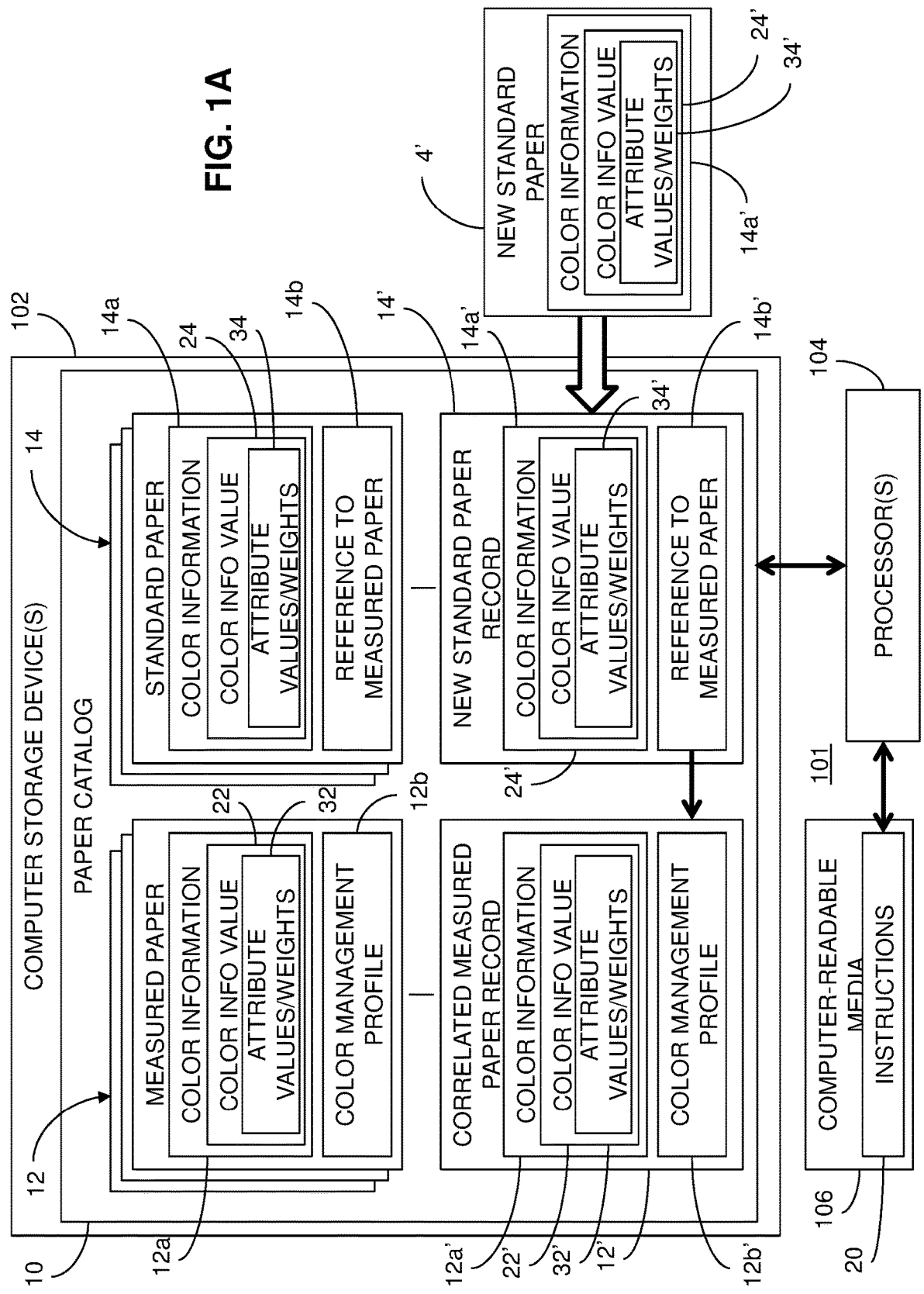
FIG. 1A illustrates an example paper catalog management system for managing paper information in a printing system, including aspects for adding a new standard paper to the paper catalog, according to aspects of the present disclosure.

While the present disclosure is susceptible to various modifications and alternative forms, a specific embodiment thereof has been shown by way of example in the drawings and will herein be described in detail. It should be understood, however, that it is not intended to limit the present disclosure to the particular forms disclosed, but on the contrary, the intention is to cover all modifications, equivalents, and alternatives falling within the spirit of the present disclosure.

DESCRIPTION

To achieve reasonable color reproduction with a reasonable level of effort, print shops may develop color management profiles for a subset of the papers they use and apply those color management profiles to other similar papers in the paper catalog. For instance, the print shop can associate similar papers to a group employing a single color management profile. The same color management profile is then employed when printing on any of these similar papers.

A printing system may employ a paper catalog that stores information for reproducing colors on different papers with a particular printer device. The paper catalog may include paper color information for different papers. Such paper color information, for instance, may include the following measurements for each paper: (i) brightness (expressed, for instance, as reflectance at a wavelength of 457 nm); (ii) whiteness (relative balance of light in the visible spectrum); (iii) fluorescence (amount of fluorescence in the whiteness measurement); and (iv) tint (non-whiteness of paper).

Although example embodiments may employ evaluations of paper brightness, whiteness, and shade, it is understood that other embodiments may consider additional or alternative information relating to paper color information, such as measurements of yellowness, opacity, gloss, or the like. Most production print spectrophotometers can measure the required paper color information. A print shop can measure the paper color information. Alternatively, another party, such as the paper producer or other vendor, may provide the paper color information.

Additionally, the paper catalog may include information relating to a color management profile for each paper. The color management profile, a set of data describing a color space, is used by the printer device for color conversion when printing on a particular paper. The color management profile, for instance, may be an International Color Consortium (ICC) profile. The ICC profile provides a set of data that characterizes the printer device according to ICC standards by defining a mapping between the printer device source and a color space, such as the CIELAB or CIEXYZ color space described further below.

Alternatively, the color management profile may be a profile implemented in terms of Tone/Tonal Reproduction Curves (TRCs). For instance, calibration of a printer device involves determining the repeatable max density for the printer device (typically 95% of the max density achieved when printing the calibration target). Calibration also involves determining the density at various amounts of ink coverage. The TRC is created to ensure that the curve is smooth and evenly spaced so that a good color ramp results. When highly accurate color reproduction is not required, using TRCs suffices. The printer device can check the calibration periodically and recalibrate to bring the printer color reproduction back to the calibrated state.

Alternatively, the color management profile may be a profile implemented in terms of TRCs included in the color conversion of an ICC profile. This may be more complex but allows color management applications to work with any printer device without having to worry about the calibration capabilities of that printer device. A downside of using an ICC profile only is that creating an ICC profile requires measuring a lot of patches. TRCs provide an ability to perform adjustments to an ICC profile by measuring a smaller set of patches. Furthermore, the TRC may be employed to provide stable color reproduction and an ICC Profile is then employed to get the desired color mapping.

According to embodiments of the present disclosure, the paper catalog includes records that are organized according to two defined categories of paper: measured papers and standard papers.

Records for measured papers include (i) color paper information as described above, and (ii) a color management profile. The color management profile can be determined by printing and measuring a test target. A vendor, such as the printer device manufacturer, can provide the color management profile, or a print shop can produce the color management profile (i.e., profile the paper).

Records for standard papers include (i) color paper information as described above, and (ii) a reference to a measured paper (or a reference to the corresponding color management profile). Records for standard papers do not include color management profiles. Instead, a standard paper is associated with the color management profile in the record of the referenced measured paper. The use of references to measured papers can greatly reduce the number of color management profiles that must be measured to manage color for all papers in the paper catalog.

The reference to a measured paper for a standard paper can be determined by comparing the paper color information of the standard paper to the paper color information for the measured papers. The measurements for the paper color information above can be expressed as numerical values (e.g., decimal numbers) that allow paper color information of different papers to be easily compared. The reference to the measured paper is thus determined by selecting the measured paper whose paper color information is closest to the paper color information of the standard paper. Different rules or criteria may be employed to determine which measured paper is closest or most appropriate for reference by the record of a standard paper.

Paper color information for the papers can be evaluated according to the CIELAB color space (also known as CIE L*a*b* color space), which is a color space defined by the International Commission on Illumination (CIE). The CIELAB color space expresses color as three values: L* for the lightness from black (0) to white (100), a* from green (−) to red (+), and b* from blue (−) to yellow (+). The CIELAB color space is designed so that the same amount of numerical change in these values corresponds to roughly the same amount of visually perceived change. The CIE L*a*b* measurements for the papers can be compared using ΔE (Delta E) measurements, which generally measure change in visual perception of two given colors according to standards overseen by the CIE. Alternatively, color paper information can be evaluated according to the CIE 1931 XYZ (CIEXYZ) color space, which measures luminosity and chromacity using a color space based on color vision.

FIGS. 1A, B illustrate an example paper catalog management system 101 for managing paper information in a printing system associated with a printer device. The system 101 includes one or more computer storage devices 102 configured to store a paper catalog 10. The paper catalog 10 includes a first set of records 12 associated with measured papers. The records 12 include respective paper color information 12a and a respective color management profile 12b for each of the measured papers. The paper catalog 10 also includes a second set of records 14 associated with standard papers. For each of the standard papers, the records 14 include respective paper color information 14a and a respective reference 14b to one of the measured papers. Through the respective reference 14b, each standard paper is associated with the color management profile 12b of one of the measured papers.

The system 101 includes processor(s) 104 configured to execute instructions 20 stored on non-transitory computer-readable media 106. The instructions 20, for instance, can cause the processor(s) 104 to implement any of the example methods described further below.

Figure 2:
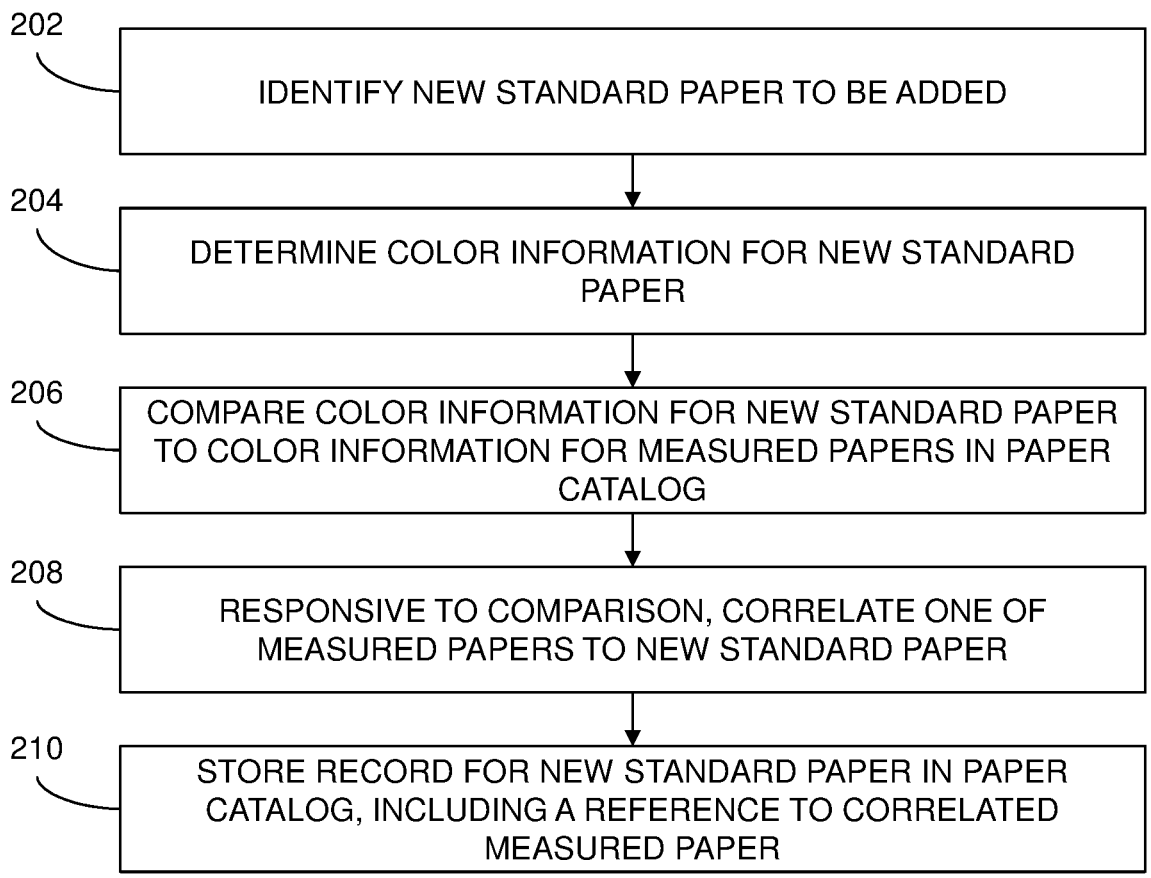
FIG. 2 illustrates an example method for adding a new standard paper to a paper catalog in a printing system, according to aspects of the present disclosure.

FIG. 2 illustrates an example method 200 for adding a new standard paper to the paper catalog 10. FIG. 1A illustrates aspects of the system 101 for implementing the method 200. The instructions 20 stored on the computer-readable media 106 can cause the processor(s) 104 to perform the method 200. According to the method 200, in an act 202, the processor(s) 104 can identify a new standard paper 4'. For instance, a user may specify the new standard paper 4' for addition to the paper catalog 10. Such input may be provided, for instance, via a digital front end (DFE) of the printing system. In an act 204, the processor(s) 104 can determine paper color information 14a' for the new standard paper 4'. As described above, the color information 14a' can be measured by most production print spectrophotometers. A print shop can measure the color information 14a'. Alternatively, another party, such as the paper producer or other vendor, may provide the color information 14a'.

In an additional act 206, the processor(s) 104 can compare the color information 14a' for the new standard paper 4' to the color information 12a stored in the records 12 for measured papers in the paper catalog 10. Based on the comparison in act 206, the processor(s) 104 can correlate one of the measured papers to the new standard paper 4' in an act 208. The correlated measured paper is associated with the record 12' shown in FIG. 1A. In a further act 210, the computer storage device(s) 102 store a record 14' for the new standard paper 4' in the paper catalog 10. The record 14' is now stored among the other records 14 associated with other standard papers. The record 14' for the new standard paper 4' includes the color information 14a' and a reference 14b' to the record 12' for the correlated measured paper. Correspondingly, the new standard paper 4' is associated with the color management profile 12b' of the correlated measured paper. In some embodiments, instead of pointing to the record 12' more generally, the reference 14b' may point more directly to the color management profile 12b' of the record 12'.

Rather than merely referring to the record 12' (or the color management profile 12b') of the correlated measured paper, the processor(s) 104 may additionally or alternatively copy the color management profile 12b' to the record 14' for the new standard paper 4'. If the color management profile 12b' for the correlated measured paper is modified, the processor(s) 104 can correspondingly modify the copy of the color management profile 12b' in the record 14'.

As described above, the measurements for color information can be expressed as numerical values (e.g., decimal numbers) that allow color information of different papers to be easily compared. As shown in FIG. 1A, the color information 12a in the records 12 for the measured papers is associated with a color information value 22. Similarly, the color information 14a in the records 14 for the standard papers is associated with a color information value 24.

Figure 3:
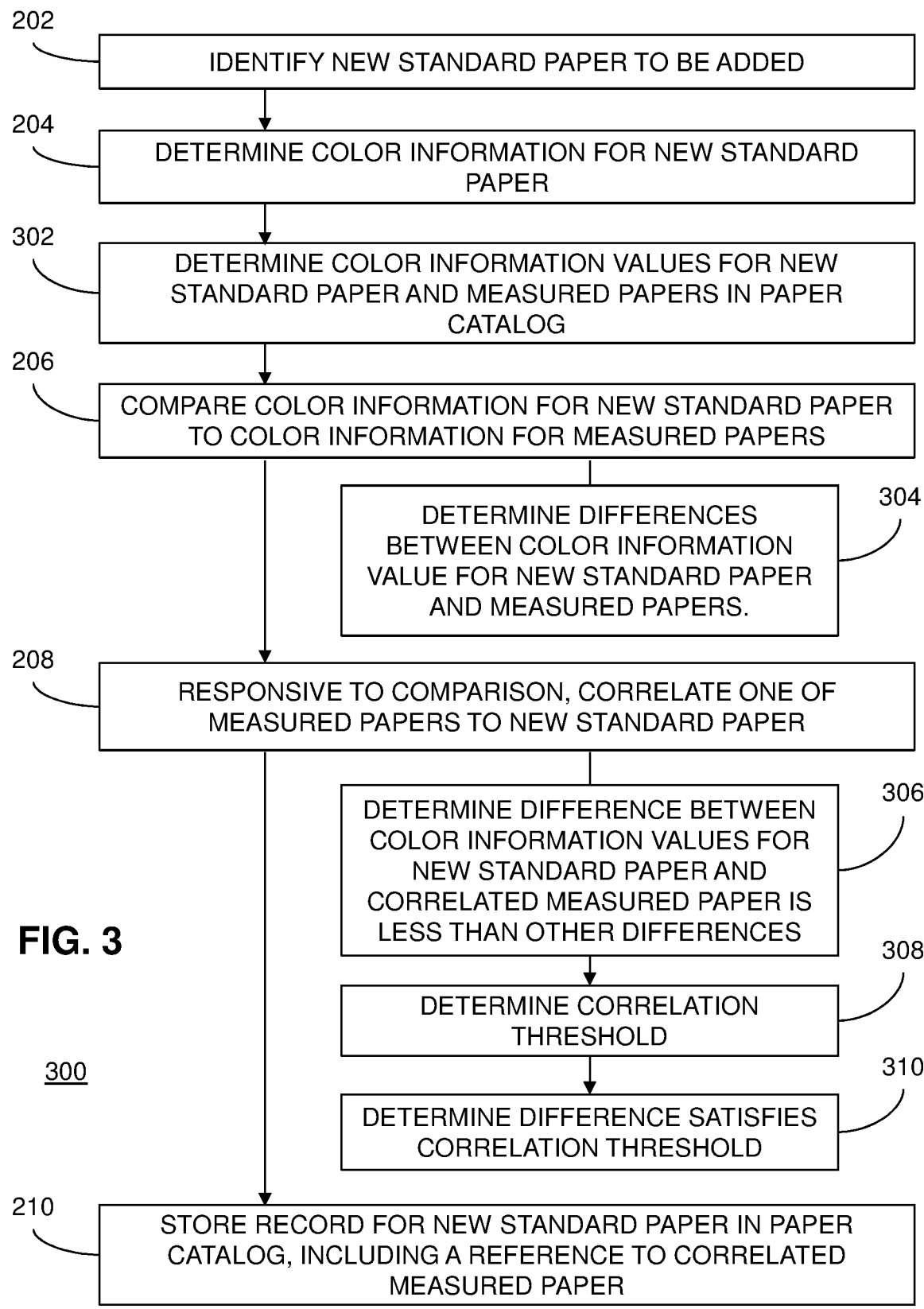
FIG. 3 illustrates further acts to supplement the example method illustrated in FIG. 2, according to aspects of the present disclosure.

FIG. 3 illustrates an example method 300 including further acts to supplement the example method 200 illustrated in FIG. 2. According to the method 300, the processor(s) 104 in an act 302 can determine a color information value 24' for the new standard paper 4' and respective color information values 22 for the records 12 associated with the measured papers. Accordingly, in an act 304, the processor(s) 104 can compare the color information 14a' for the new standard paper 4' to the color information 12a for the measured papers by determining differences between the color information value 24' for the new standard paper 4' and the color information value 22 for each of the records 12. Additionally, in an act 306, the processor(s) 104 can correlate the measured paper (the record 12') to the new standard paper 4' by determining that the difference between the color information value 24' for the new standard paper 4' and the color information value 22' for the correlated measured paper is less than the other differences.

The selection of the correlated measured paper 4' may involve applying different rules or criteria. For instance, the user may define thresholds that must be satisfied before the standard paper 2' is associated with a measured paper. According to the method 300, the processor(s) 104 may correlate one of the measured papers to the new standard paper 4' by further determining a correlation threshold in an act 308 and determining that the difference between the color information value 24' for the new standard paper 4' and the color information value 22' for the correlated measured paper satisfies the correlation threshold in act 310. The correlated measured paper must be sufficiently similar to the new standard paper 4', i.e., within the correlation threshold, before the correlated measured paper (the record 12') is associated with the new standard paper 4' via the reference 14b' in the paper catalog 10. If the difference between the color information value 24' for the new standard paper 4' and a color information value 22 for any of the records 12 for the measured papers fails to satisfy the correlation threshold, the record 14' for the new standard paper 4' may be recorded without a reference 14b' to a measured paper.

As shown further in FIG. 1A, the color information 14a for the standard papers and the color information 12a for the measured papers are defined according to a plurality of attributes. For instance, the plurality of attributes may include brightness, whiteness, tint, yellowness, opacity, and/or gloss. The color information 12a for the measured papers may be associated with attribute values 32, i.e., measurements for each of the plurality of attributes. The color information 14a for the standard papers may be associated with attribute values 34, i.e., measurements for each of the plurality of attributes. As described above, for instance, the color information 14a' for the new standard paper 4' can be determined by measuring the color information 14a' with a spectrophotometer.

Thus, in the act 302, the processor(s) 104 may determine the color information value 24' for the new standard paper 4' according to a (numerical) combination of the attribute values 34'. Additionally, the processor(s) 104 may determine the color information values 22 for the measured papers according to a (numerical) combination of the attribute values 32. The processor(s) 104 may correlate one of the measured papers to the new standard paper 4' by additionally determining one or more correlation thresholds based on the plurality of attributes, and then determining that difference(s) between the attribute values 34' for the new standard paper 4' and corresponding attribute values 32' for the correlated measured paper satisfy the one or more correlation thresholds. As such, one or more of the attributes of the new standard paper 4' must be sufficiently similar to the corresponding attributes of the correlated measured paper, i.e., within the correlation thresholds, before the correlated measured paper (the record 12') can be associated with the new standard paper 4' via the reference 14b'. If the difference between one of the attribute values 34' for the new standard paper 4' and a corresponding attribute value 32' for the correlated measured paper 2' fails to satisfy a correlation threshold, the record 14' for the new standard paper 4' can be recorded without a reference 14b' to a measured paper 2.

As indicated in FIG. 1A, each of the plurality of attributes may be associated with a respective weighting. In some cases, such weighting may depend on a configuration of the printer device. For instance, a monochrome printer device may give more weight to tint information whereas a color printer device may give more weight to brightness and fluorescence information. Correspondingly, the color information value 24 for the new standard paper 4' and the color information values 22 for the measured papers may be further determined according to the weightings for the plurality of attributes. Additionally, the processor(s) 104 may identify a printer device (e.g., monochrome printer device, color printer device, etc.) and determine the weightings of the plurality of attributes 16 according to the printer device.

Figure 1B:
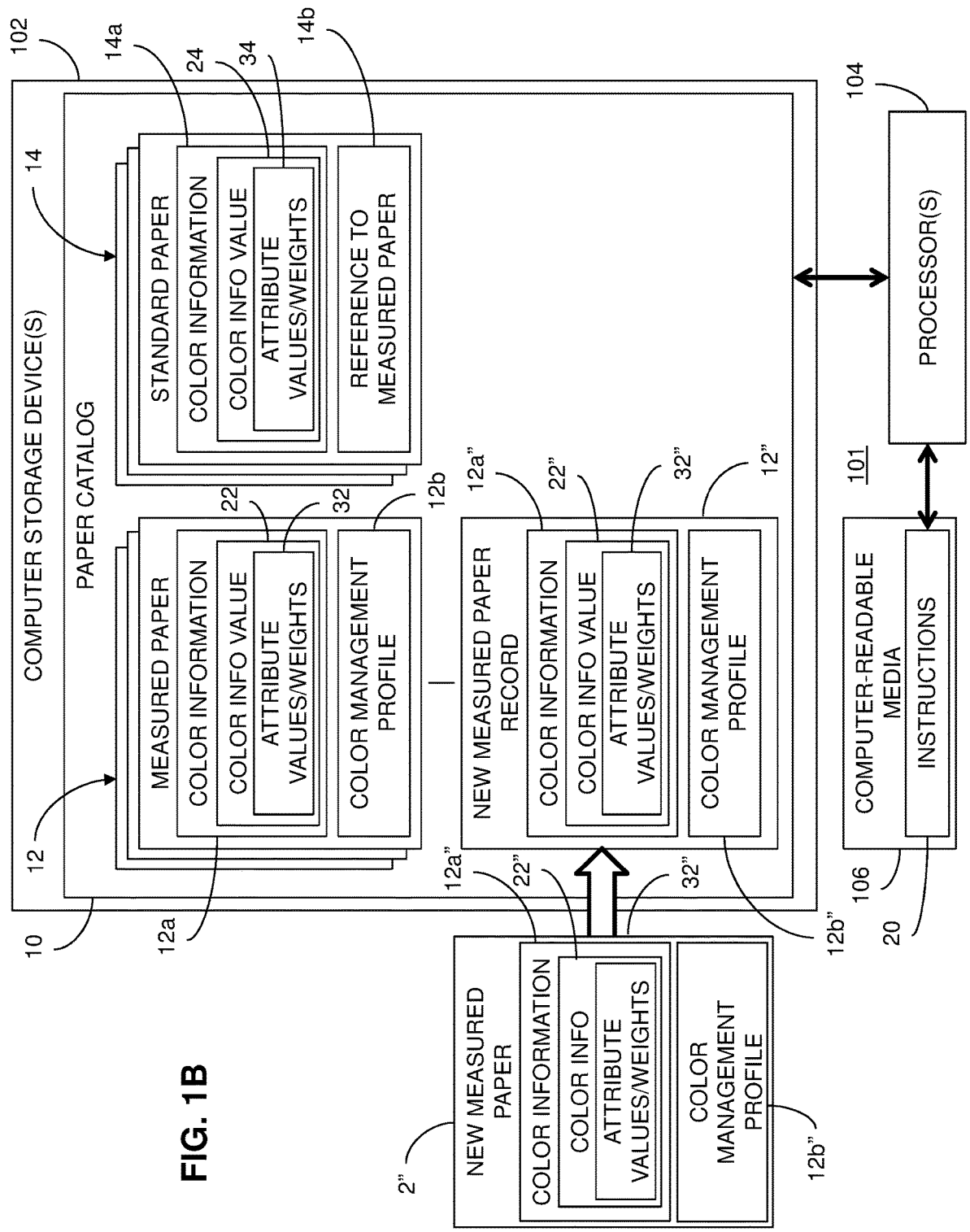
FIG. 1B illustrates the example system of FIG. 1A, including aspects for adding a new measured paper to the paper catalog, according to aspects of the present disclosure.
Figure 4:
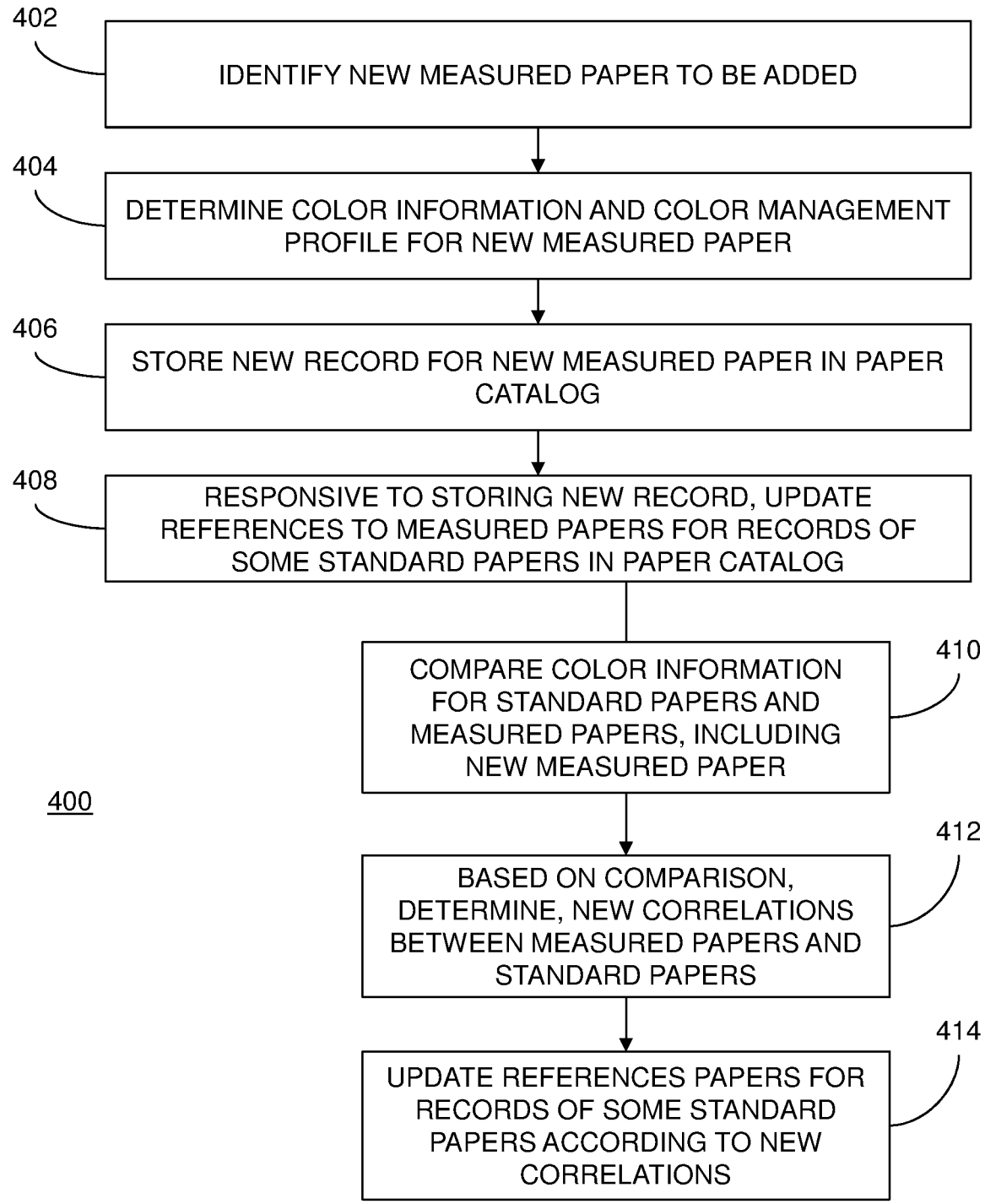
FIG. 4 illustrates an example method for adding a new measured paper to a paper catalog in a printing system, according to aspects of the present disclosure.

FIG. 4 illustrates an example method 400 for adding a new measured paper to the paper catalog 10. FIG. 1B illustrates aspects of the system 101 for implementing the method 400. As described above, the print catalog 10 includes the first set of records 12 associated with the measured papers, where the records 12 include respective color information 12a and a respective color management profile 12b for each of the measured papers. Additionally, the print catalog includes the second set of records 14 associated with standard papers, where the records 14 include a respective reference 14b to one of the records 12 for the measured papers in the paper catalog 10.

The instructions 20 stored on the computer-readable media 106 can cause the processor(s) 104 to perform the method 400. According to the method 400, the processor(s) 104, in an act 402, can identify a new measured paper 2" to be added to the paper catalog 10. The new measured paper 2" is not associated with any of the records 12 in the paper catalog 10. In an act 404, the processor(s) 104 can determine paper color information 12a" and a color management profile 12b" for the new measured paper 2". As described above, a print shop can produce the color management profile 12a" or the color management profile 12b". Alternatively, another party, such as a vendor, can provide information for the color information 12a" or the color management profile 12b".

In an act 406, the computer storage device(s) 102 store a record 12" for the new measured paper 2" in the paper catalog 10. The record 12" includes the color information 12a" and the color management profile 12b" for the new measured paper 2". The record 12" is now included in the paper catalog 10 among the previously stored measured papers. At this point, each record 14 for the standard papers remains associated, through the respective reference 14b, with the color management profile 12b of one of the previously stored measured papers. However, with the addition to the paper catalog 10, the color management profile 12b" of the new measured paper 2" may provide a most appropriate color management profile for color conversion on some of the standard papers. The color information 12a" of the new measured paper 2" may be more similar to the color information 14a for some of the standard papers than the color information 12a for the previously stored measured papers. Accordingly, in an act 408, responsive to storing the new record 12" for the new measured paper 2" in the paper catalog 10, the processor(s) 104 may update the references 14b for the records 14 of some of the standard papers.

To update the references 14b for the records 14 of some of the standard papers, the processor(s) 104 may compare, in an act 410, the color information 14a for the standard papers and the color information 12a for the measured papers, which now includes the new measured paper 2". These comparisons may be achieved in a manner similar to the comparisons described in the methods above, e.g., comparing color information values, which may be based on a plurality of weighted or unweighted attribute values. Based on the comparison in the act 410, the processor(s) determine, in an act 412, new correlations between the measured papers and the standard papers. These correlations may also be achieved in a manner similar to the correlations described in the methods above, e.g., applying correlation thresholds to color information values and/or attribute values. In an act 414, the processor(s) 104 can update the references 14b for the records 14 in the paper catalog 10 according to the new correlations.

Figure 5:
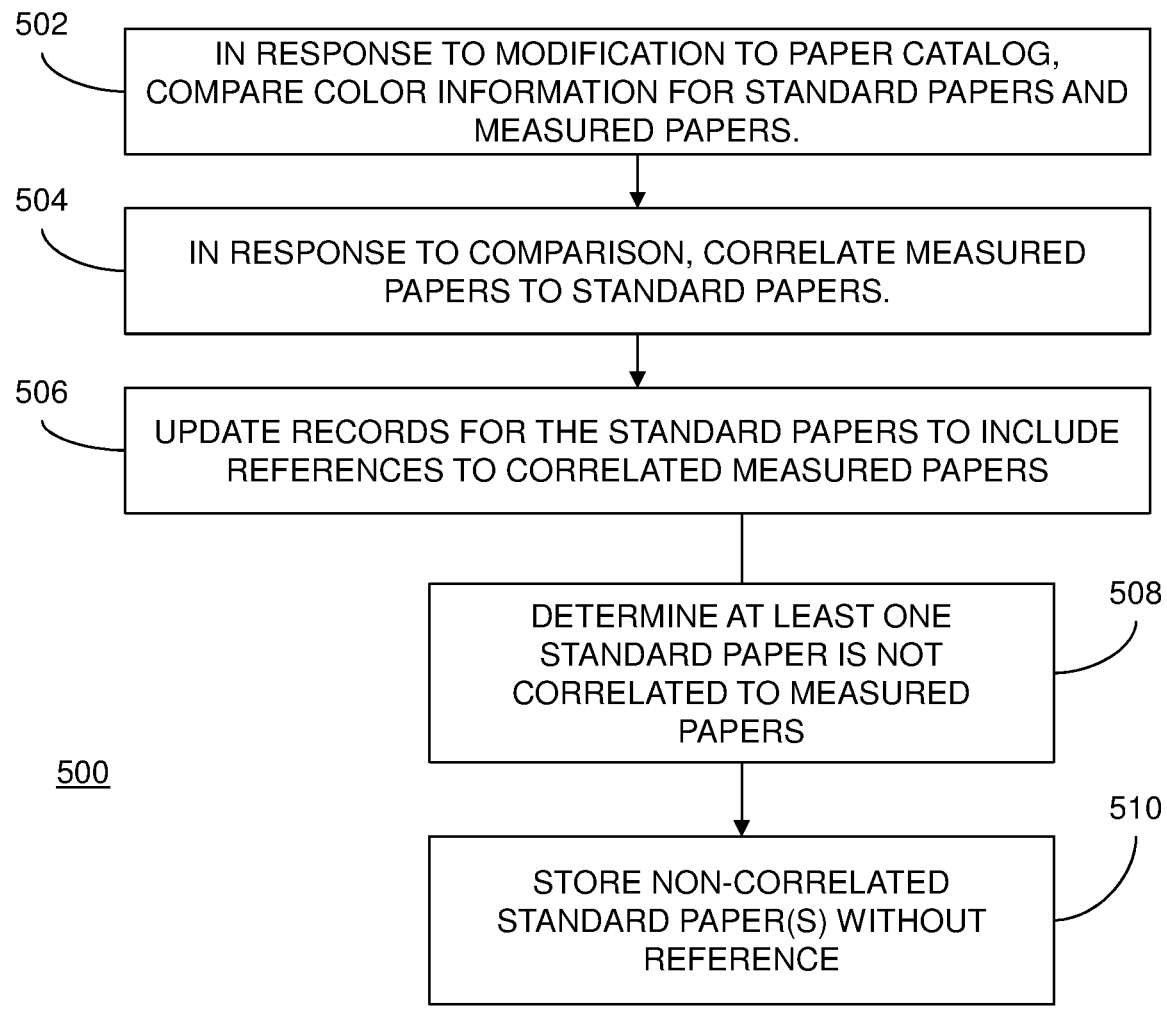
FIG. 5 illustrates an example method for dynamically correlating measured papers to standard papers in response to updates to a paper catalog in a printing system, according to aspects of the present disclosure.

In general, the measured papers can be dynamically correlated to the standard papers in response to different updates to the paper catalog 10, as illustrated by FIG. 5. The instructions 20 stored on the computer-readable media 106 can cause the processor(s) 104 to perform an example method 500 shown in FIG. 5. As described above, the measured papers and standard papers are distinguished in the paper catalog 10 by records having or not having a color management profile 12b (as opposed to a reference 14b). In other words, each record 12 for the measured papers has respective color paper information 12a and a respective color management profile 12b, while each record 14 for the standard papers has respective color paper information 14a but no respective color management profile.

The processor(s) 104 can automatically and dynamically respond to a modification to the paper catalog 10 in an act 502 by comparing the color information 14a for the standard papers and the color information 12a for the measured papers. These comparisons may be achieved in a manner similar to the comparisons described in the methods above, e.g., comparing color information values, which may be based on a plurality of weighted or unweighted attribute values.

The modification to the paper catalog 10 may include adding a new record 12, 14 for a new measured paper or a new standard paper to the paper catalog 10. The modification to the paper catalog 10 may include deleting a record 12, 14 from the paper catalog 10. The modification to the paper catalog 10 may include converting a measured paper to a standard paper by removing the respective color management profile 12a from the corresponding record 12. The modification to the paper catalog 10 may include converting a standard paper to a measured paper by adding a color management profile to the corresponding record 14.

The modification to the paper catalog 10 may include modifying the respective color information 12a, 14a for at least one of the records 12, 14, or modifying the respective color management profile 12b for at least one of the records 12. As described above, a print shop can produce the color management profile or the color management profile. Alternatively, another party, such as a vendor, can provide information for the color information or the color management profile. Where the print shop produces a color management profile and/or a color management profile, a vendor-provided information can be retained so that one has an option to revert to this information. Reverting to the vendor-provided information may be a modification to the printer catalog 10.

In response to the comparison in the act 502, the processor(s) 104 in act 504 can correlate the measured papers to the standard papers. The correlation in the act 502 may be achieved in a manner similar to the correlations described in the methods above, e.g., applying correlation thresholds to color information values and/or attribute values. In an act 506, the processor(s) 104 can further update the records 12, 14 of the paper catalog 10 according to the correlations between the measured papers and the standard papers. According to one embodiment, the processor(s) 104 may correlate one of the measured papers to each of the standard papers in the act 504, and in response, update the records 14 for the standard papers in an act 506 to include references 14b to the correlated measured papers. According to some embodiments, the processor(s) may determine in a further act 508 that at least one of the standard papers is not correlated to one of the measured papers, and as such, the computer storage device(s) 102 can store the record(s) 14 for the non-correlated standard paper(s) without a reference 14b in an act 510.

When a user selects a paper, the printing system by default can use the color management profile 12b stored in the paper catalog 10 for a color conversion on measured paper. Alternatively, the printing system by default can process the reference 14b stored in the paper catalog to obtain a color management profile for color conversion on a standard paper. The printing system, however, may allow associations between the standard papers and the measured papers to be dynamically modified (e.g., at the time of printing). For instance, the printing system may allow a user to input print instructions (e.g., via the DFE) that specify different attribute weightings and/or correlation thresholds. The print instructions can be provided, for instance, through printer device settings. These specifications for attribute weightings and/or correlation thresholds may generate correlations between the standard papers and the measured papers that are different from the correlations that are stored in the paper catalog 10. For instance, for monochrome printing, the user may input print instructions that give tint more weight. Or for color printing, the user may input print instructions that give brightness more weight. Or to produce higher quality reproduction, the user may input print instructions with correlation thresholds that require a greater similarity between a standard paper and the correlated measured paper.

Furthermore, the printing system may allow a user to define rules for selecting different settings for attribute weightings and/or correlation thresholds in particular circumstances. For instance, rules may specify settings with different attribute weightings for monochrome jobs that are more than 100 pages or for color jobs that are more than 100 MB in size. Or for print jobs for a customer with particular requirements, rules may specify settings with different correlation thresholds. Such rules may involve any type of print job information available to color conversion system or the printing system generally (either at the DFE of the printing system or upstream of the DFE). Additionally, the printing system may also apply rules to handle particular exceptional conditions. For instance, rules may prevent the printing system to complete print jobs on standard papers for particular customers if the records 14 for standard papers do not include a reference 14b to a measured paper.

Accordingly, for standard papers, the references to measured papers may be stored statically in the paper catalog 10 as the references 14b in the records 14. Alternatively, the references to measured papers may be dynamically determined in real time (e.g., at the time of printing) according print instructions from the user (e.g., with specifications/rules for attribute weightings or correlation thresholds) which may generate different correlations. The references to measured papers determine the color management profiles and thus the color conversion in the print jobs on standard papers. The users can control the color management profiles for as many or as few papers as desired. The printing system is then responsible for using the resulting color management profiles with as many papers as possible.

Figure 6:
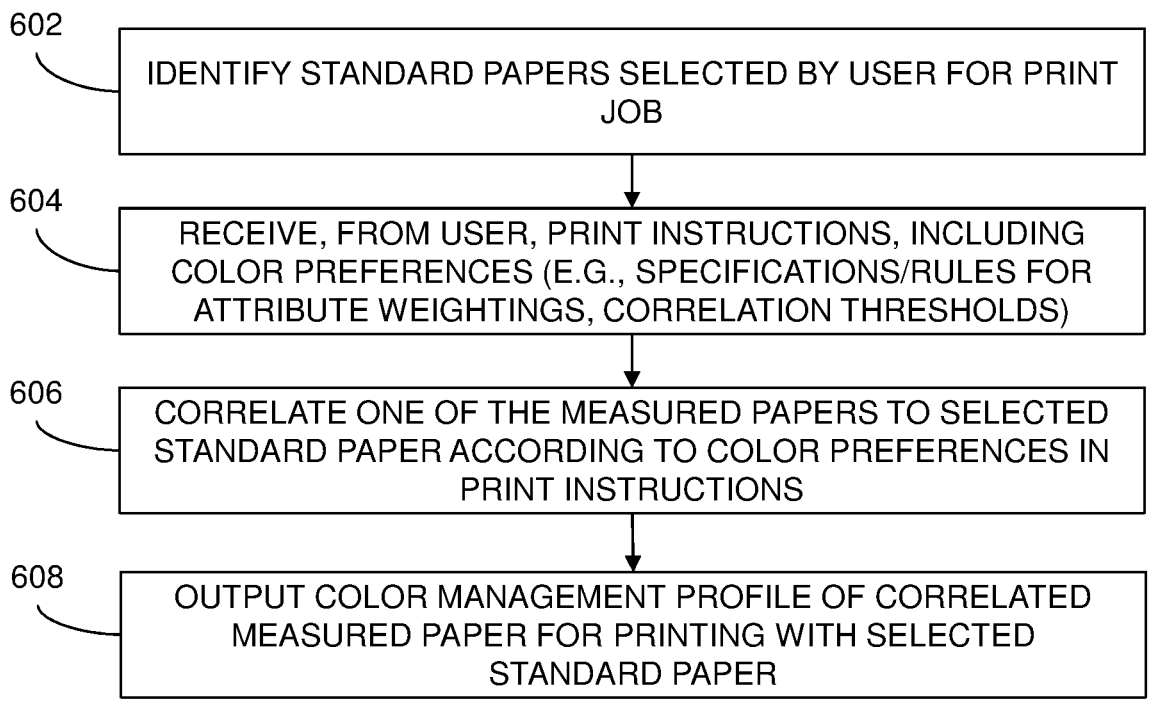
FIG. 6 illustrates an example method for handling print instructions from a user, according to aspects of the present disclosure.

FIG. 6 illustrates an example method 600 for handling print instructions from a user. As described above, the measured papers and standard papers are distinguished in the paper catalog 10 by records having or not having a color management profile 12b (as opposed to a reference 14b). In other words, each record 12 for the measured papers has respective paper information 12a and a respective color management profile 12b, while each record 14 for the standard papers has respective paper information 14a but no respective color management profile.

The instructions 20 stored on the computer-readable media 106 can cause the processor(s) 104 to perform the method 600. According to the method 600, in an act 602, the processor(s) 104 can identify one of the standard papers selected by a user for a print job. In an act 604, the processor(s) 104 can receive, from the user, print instructions including color preferences. The color preferences, for instance, may be determined by specifications/rules for attribute weightings or correlation thresholds as described above. In an act 606, the processor(s) 104 can correlate one of the measured papers to the selected standard paper according to the color preferences in the print instructions. In an act 608, the processor(s) 104 can output the color management profile of the correlated measured paper for printing with the selected standard paper.

If the color preferences involve correlation thresholds, the processor(s) 104 can determine respective color information values for the selected standard paper and the correlated measured paper. The processor(s) 104 can then determine a difference between the respective color information values for the selected standard paper and the correlated measured paper, where the color preferences includes a correlation threshold. Accordingly, the processor(s) 104 can correlate one of the measured papers to the selected standard paper by determining whether the difference between the respective color information values for the selected standard paper and the correlated measured paper satisfies the correlation threshold.

In some embodiments, the color information for the selected standard paper and the color information for the measured papers are defined according to a plurality of attributes, and the print instructions include color preferences relating to the plurality of attributes. For instance, the plurality of attributes may include a measurement of brightness, whiteness, tint, yellowness, opacity, and/or gloss. For these embodiments, the processor(s) 104 can determine attribute values for the plurality of attributes for the selected standard paper and the correlated measured paper. Additionally, the processor(s) 104 can determine differences between the attribute values for the selected standard paper and the correlated measured paper. Furthermore, the processor(s) 104 in the act 606 can correlate one of the measured papers to the selected standard paper by determining whether the differences between the attribute values for the selected standard paper and the correlated measured paper satisfy one or more correlation thresholds.

In further embodiments, the color preferences include one or more weightings relating to the plurality of attributes. For such embodiments, the processor(s) 104 can determine attribute values for the plurality of attributes for the selected standard paper and the correlated measured paper based on the one or more weightings. Additionally, the processor(s) 104 can determine differences between the attribute values for the selected standard paper and the correlated measured paper. Thus, the processor(s) 104 in the act 606 can correlate the correlated measured paper to the selected standard paper according to the differences between the attribute values for the selected standard paper and the correlated measured paper.

Figure 7:
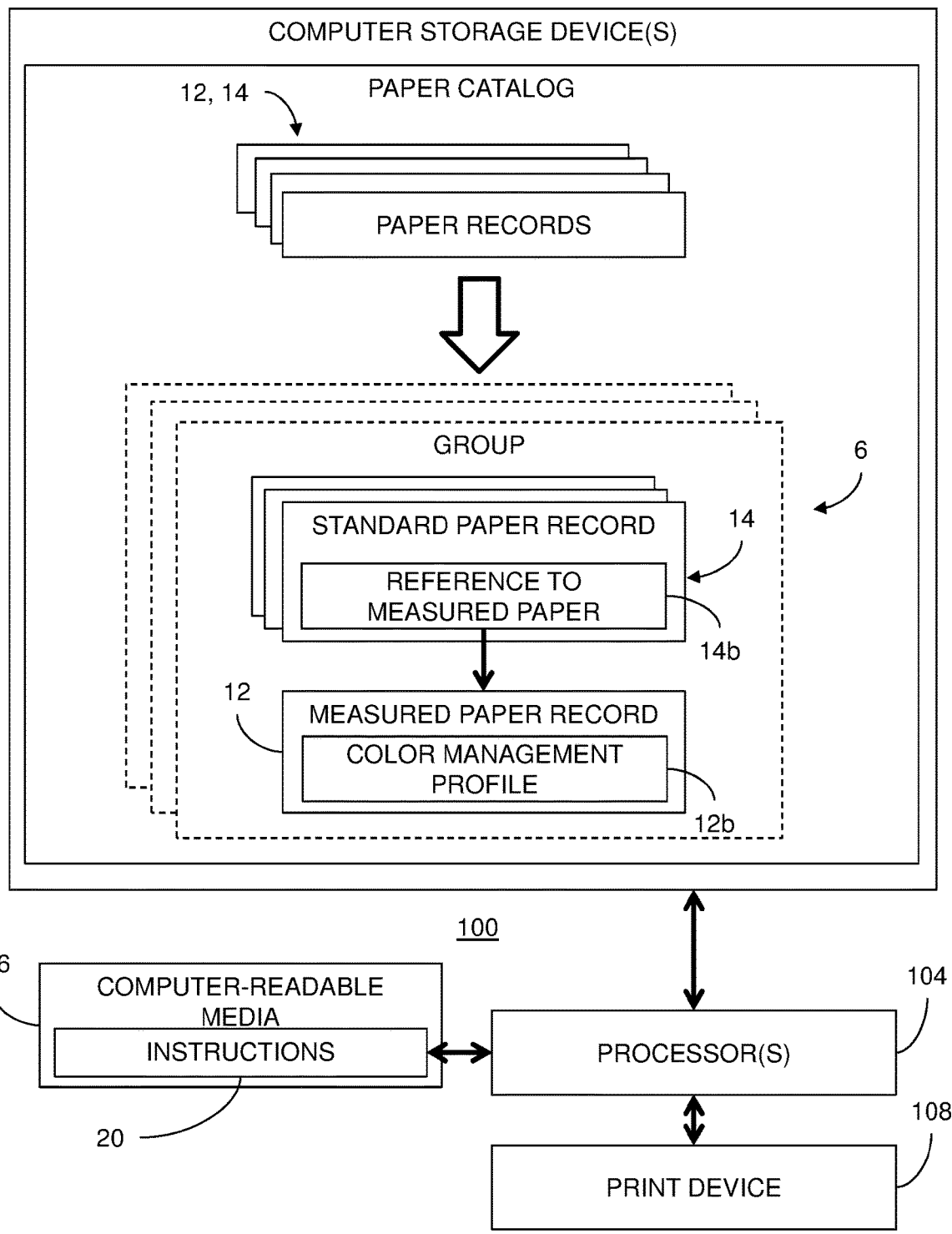
FIG. 7 illustrates an example printing system that evaluates color information for the papers in a paper catalog in a printing system and organizes the papers with similar characteristics into groups, according to aspects of the present disclosure.

The printing system may also include a feature for recommending which papers should be profiled (with a color management profile) to get reasonable color reproduction while maintaining the smallest possible number of color management profiles. As shown in FIG. 7, the printing system 100 with a printer device 108 can evaluate the color information for the papers in the paper catalog 10 and organize the papers with similar characteristics into groups 6. A user may control how the papers are organized, including determining the number and/or size of the groups 6. Once the papers are organized into the groups 6, the printing system 100 can identify a representative paper for each group 6 and recommends that the representative paper be profiled for the respective group 6. With a color management profile, the representative paper is the only measured paper associated with a record 12 in the group 6, while the other papers in the group 6 are standard papers associated with records 14 including a reference 14b to the representative measured paper. The number of standard papers associated with the measured paper in the group 6 may be determined according to thresholds that define how similar the standard papers should be to the measured paper in the group 6. For instance, the standard papers and the measured paper in the group satisfy a correlation threshold.

Figure 8:
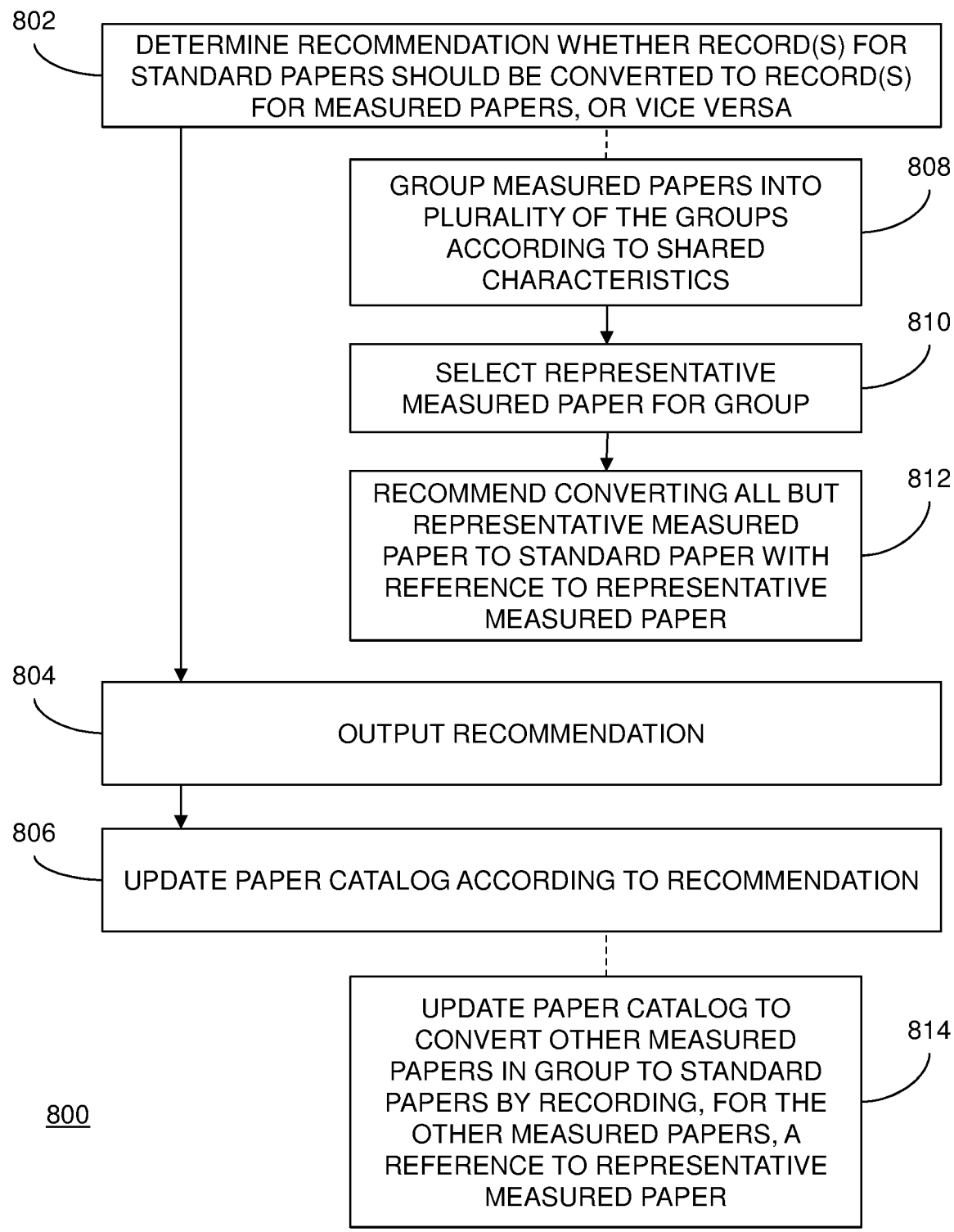
FIG. 8 illustrates an example method for organizing the papers in a paper catalog in a printing system, according to aspects of the present disclosure.

FIG. 8 illustrates an example method 800 for organizing the papers in the paper catalog 10. As described above, the measured papers and standard papers are distinguished in the paper catalog 10 by records having or not having a color management profile 12b (as opposed to a reference 14b). In other words, each record 12 for the measured papers have respective color paper information 12a and a respective color management profile 12b, while each record 14 for the standard papers has respective color paper information 14a but no respective color management profile.

The instructions 20 stored on the computer-readable media 106 can cause the processor(s) 104 to perform the method 800. According to the method 800, the processor(s) 104 in an act 802 can determine a recommendation indicating whether one or more of the records for standard papers should be converted to records for measured papers and whether one or more of the records for measured papers should be converted to records for standard papers. In an act 804, the processor(s) 104 can output the recommendation determined in the act 802. Furthermore, in an act 806, the processor(s) 104 can update the paper catalog 10 according to the recommendation.

To develop a recommendation, the processor(s) 104 can group the measured papers into a plurality of the groups 6 according to shared characteristics in an act 808. These shared characteristics, for instance, may relate to the respective color information for the measured papers. In other words, the groups 6 can be defined to organize subsets of the measured papers with color information values that fall within a specified range. As described above, the number of standard papers associated with the measured paper in the group 6 may be determined according to thresholds that define how similar the standard papers should be to the measured paper in the group 6. For each group, the processor(s) 104 can select a representative one of the measured papers in an act 810. For instance, the selected measured paper may be most representative by having a color information value that is closest to the average color information value for the measured papers in the group 6. Thus, in an act 812, the processor(s) 104 can thus recommend converting all but the representative measured paper to a standard paper with reference to the representative measured paper. Accordingly, in the act 814, the processor(s) 104 can update the paper catalog to convert other measured papers in the group to standard papers by recording, for the other measured papers, a reference to the representative measured paper. The standard papers then are associated with the color management profile of the representative measured paper.

In some embodiments, the paper catalog 10 includes previous records 14 for standard papers with references 14b to the measured papers that are converted to the standard papers in the act 814. In such embodiments, the processor(s) 104 can also update the paper catalog by updating the previous records to include updated references 14b to the representative measured paper, so that the previous standard papers are associated with the color management profile of the representative measured paper.

As described above, the recommendation may be determined by thresholds that define how similar the standard papers should be to the measured paper in the group 6. In cases where the thresholds are more stringent, the recommendation may result in more measured papers (and groups). Alternatively, in cases where the thresholds are more stringent, the recommendation may result in fewer measured papers (and groups).

Aspects of the systems above may be implemented as a combination of hardware and software elements. The hardware elements may be implemented as combinations of operatively coupled microprocessors, logical circuitry, communication/networking ports, digital filters, memory, or logical circuitry. The processor(s) may be adapted to perform operations specified by computer-executable instructions, which may be stored on a computer readable medium. The example embodiments are not limited to any specific combination of hardware circuitry and/or software.

As described above, some or all of the acts of the described and illustrated methods can be performed or guided under the control of one or more processors (e.g., the processor(s) 104) that execute software, or stored instructions. In general, physical processors and/or machines employed by embodiments of the present disclosure for any processing or evaluation may include one or more networked or non-networked general purpose computer systems, microprocessors, field programmable gate arrays (FPGA's), digital signal processors (DSP's), micro-controllers, and the like, programmed according to the teachings of the example embodiments of the present disclosure, as is appreciated by those skilled in the computer and software arts.

Appropriate software can be readily prepared by programmers of ordinary skill based on the teachings of the example embodiments, as is appreciated by those skilled in the software art. Stored on any one or on a combination of non-transitory computer readable media, the example embodiments of the present disclosure may include software for controlling the devices and subsystems of the example embodiments, for driving the devices and subsystems of the example embodiments, for enabling the devices and subsystems of the example embodiments to interact with a human user, and the like. Such software can include, but is not limited to, device drivers, firmware, operating systems, development tools, applications software, and the like. Such computer readable media further can include the computer program product of an embodiment of the present disclosure for performing all or a portion (if processing is distributed) of the processing performed in implementations. Computer code devices of the example embodiments of the present disclosure can include any suitable interpretable or executable code mechanism, including but not limited to scripts, interpretable programs, dynamic link libraries (DLLs), Java classes and applets, complete executable programs, and the like. Moreover, parts of the processing of the example embodiments of the present disclosure can be distributed for better performance, reliability, cost, and the like.

Common forms of non-transitory computer-readable media may include, for example, a floppy disk, a flexible disk, hard disk, magnetic tape, any other suitable magnetic medium, a CDROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, or any other suitable medium from which a computer can read.

While the present disclosure has been described with reference to one or more particular embodiments, those skilled in the art will recognize that many changes may be made thereto without departing from the spirit and scope of the present disclosure. Each of these embodiments and obvious variations thereof is contemplated as falling within the spirit and scope of the invention. It is also contemplated that additional embodiments according to aspects of the present disclosure may combine any number of features from any of the embodiments described herein.

What is claimed is:

1. A method for managing paper information in a printing system, comprising:

storing, in one or more computer storage devices, a paper catalog, the paper catalog including records associated with measured papers, the records including respective color information and a respective color management profile for each of the measured papers;

identifying, by one or more computer processors, a standard paper;

determining, by the one or more computer processors, color information for the standard paper;

comparing, by the one or more computer processors, the color information for the standard paper and the color information for the measured papers, wherein the color information for the standard paper and the color information for the measured papers are defined according to a plurality of attributes;

determining, by the one or more computer processors, a color information value for the standard paper and respective color information values for the measured papers, wherein the color information value for the standard paper and the color information values for the measured papers are determined according to the plurality of attributes, and wherein comparing the color information for the standard paper and the color information for the measured papers includes determining differences between the color information value for the standard paper and the color information value for each of the measured papers;

determining, by the one or more computer processors, criteria selected from one or more correlation thresholds relating to the plurality of attributes or one or more weightings relating to the plurality of attributes;

determining, by the one or more computer processors, attribute values for the plurality of attributes for the standard paper and the correlated measured paper based on the selected criteria of one or more correlation thresholds or one or more weightings;

responsive to comparing the color information for the standard paper and the color information for the measured papers, correlating, by the one or more computer processors, one of the measured papers to the standard paper, wherein such correlation includes determining that the difference between the value of one of the attributes for the color information for the standard paper and the color information for the correlated measured paper satisfy the selected criteria of one or more correlation thresholds or one or more weightings; and storing, in the one or more computer storage devices, a record for the standard paper in the paper catalog, the record for the standard paper including the color information for the standard paper and a reference to the correlated measured paper, wherein the standard paper is associated with the color management profile of the correlated measured paper.

2. The method of claim 1, wherein correlating one of the measured papers to the standard paper includes:
determining a correlation threshold, and
determining that the difference between the color information value for the standard paper and the color information value for the correlated measured paper satisfies the correlation threshold.

3. The method of claim 1, wherein each of the plurality of attributes is associated with a respective weighting, and
the color information value for the standard paper and the color information values for the measured papers are further determined according to the weightings of the plurality of attributes, and
the method further comprises:
identifying, by the one or more computer processors, a printer device and determining the weightings of the plurality of attributes according to the printer device.

4. The method of claim 1, wherein the color information for the standard paper and the color information for the measured papers are defined according to a plurality of attributes including a measurement of at least one of brightness, whiteness, tint, yellowness, opacity, or gloss.

5. The method of claim 1, further comprising copying the color management profile for the correlated measured paper to the record for the standard paper.

6. The method of claim 1, further comprising:
modifying the color management profile for the correlated measured paper; and
responsive to modifying the color management profile for the correlated measured paper, modifying the color management profile copied to the record for the standard paper.

7. A system for managing paper information in a printing system, comprising:
one or more computer storage devices configured to store a paper catalog, the paper catalog including records associated with measured papers, the records including respective color information and a respective color management profile for each of the measured papers; and
one or more processors configured to execute instructions stored on computer-readable media, the instructions causing the one or more processors to:
identify a standard paper;
determine color information for the standard paper;
compare the color information for the standard paper and the color information for the measured papers, wherein the color information for the standard paper and the color information for the measured papers are defined according to a plurality of attributes;
determine a color information value for the standard paper and respective color information values for the measured papers, wherein the color information value for the standard paper and the color information values for the measured papers are determined according to the plurality of attributes, and wherein comparing the color information for the standard paper and the color information for the measured papers includes determining differences between the color information value for the standard paper and the color information value for each of the measured papers;
determine criteria selected from one or more correlation thresholds relating to the plurality of attributes or one or more weightings relating to the plurality of attributes;
determine attribute values for the plurality of attributes for the standard paper and the correlated measured paper based on the selected criteria of one or more correlation thresholds or one or more weightings;
responsive to comparing the color information for the standard paper and the color information for the measured papers, correlate one of the measured papers to the standard paper, wherein such correlation includes determining that the difference between the value of one of the attributes for the color information for the standard paper and the color information for the correlated measured paper satisfy the selected criteria of one or more correlation thresholds or one or more weightings; and
store, in the one or more computer storage devices, a record for the standard paper in the paper catalog, the record for the standard paper including the color information for the standard paper and a reference to the correlated measured paper, wherein the standard paper is associated with the color management profile of the correlated measured paper.

8. The system of claim 7, wherein the one or more processors correlate one of the measured papers to the standard paper by:
determining a correlation threshold, and
determining that the difference between the color information value for the standard paper and the color information value for the correlated measured paper satisfies the correlation threshold.

9. The system of claim 7, wherein each of the plurality of attributes is associated with a respective weighting, and
the color information value for the standard paper and the color information values for the measured papers are further determined according to the weightings of the plurality of attributes.

10. The system of claim 7, wherein the paper catalog includes additional records associated with other standard papers, the additional records including respective color information and a respective reference to one of the measured papers for each of the other standard papers.

11. One or more non-transitory computer-readable storage media, having computer-executable instructions stored thereon, wherein when executed by a one or more processors, the computer-executable instructions cause the one or more processors to:
store, in one or more computer storage devices, a paper catalog, the paper catalog including records associated with measured papers, the records including respective color information and a respective color management profile for each of the measured papers;
identify a standard paper;
determine color information for the standard paper;
compare the color information for the standard paper and the color information for the measured papers, wherein the color information for the standard paper and the color information for the measured papers are defined according to a plurality of attributes;
determine a color information value for the standard paper and respective color information values for the measured papers, wherein the color information value for the standard paper and the color information values for the measured papers are determined according to the plurality of attributes, and wherein comparing the color information for the standard paper and the color information for the measured papers includes determining differences between the color information value for the standard paper and the color information value for each of the measured payers;

determine criteria selected from one or more correlation thresholds relating to the plurality of attributes or one or more weightings relating to the plurality of attributes;

determine attribute values for the plurality of attributes for the standard paper and the correlated measured paper based on the selected criteria of one or more correlation thresholds or one or more weightings;

responsive to comparing the color information for the standard paper and the color information for the measured papers, correlate one of the measured papers to the standard paper, wherein such correlation includes determining that the difference between the value of one of the attributes for the color information for the standard paper and the color information for the correlated measured paper satisfy the selected criteria of one or more correlation thresholds or one or more weightings; and store, in the one or more computer storage devices, a record for the standard paper in the paper catalog, the record for the standard paper including the color information for the standard paper and a reference to the correlated measured paper, wherein the standard paper is associated with the color management profile of the correlated measured paper.

12. The one or more non-transitory computer-readable media of claim 11, wherein the one or more processors correlate one of the measured papers to the standard paper by further:

determining a correlation threshold, and determining that the difference between the color information value for the standard paper and the color information value for the correlated measured paper satisfies the correlation threshold.

13. The one or more non-transitory computer-readable media of claim 11, wherein each of the plurality of attributes is associated with a respective weighting, and the color information value for the standard paper and the color information values for the measured papers are further determined according to the weightings of the plurality of attributes.

* * * * *